United States Patent [19]
Varma et al.

[11] Patent Number: 5,621,773
[45] Date of Patent: Apr. 15, 1997

[54] METHOD AND APPARATUS FOR FAST SYNCHRONIZATION OF T1 EXTENDED SUPERFRAMES

[75] Inventors: Subir Varma, San Jose; Thomas Daniel, Los Altos Hills; Dieter Nattkemper, San Jose, all of Calif.

[73] Assignee: LSI Logic Corporation, Milpitas, Calif.

[21] Appl. No.: 611,327

[22] Filed: Mar. 8, 1996

[51] Int. Cl.⁶ .................................................. H04L 7/00
[52] U.S. Cl. .......................................... 375/368; 370/509
[58] Field of Search ..................................... 375/354, 366, 375/368; 370/100.1, 105.1

[56] References Cited

U.S. PATENT DOCUMENTS

| | | | |
|---|---|---|---|
| 4,434,498 | 2/1984 | Mathieu | 375/114 |
| 4,573,172 | 2/1986 | Grimaldi | 375/116 |
| 4,633,486 | 12/1986 | Berlekamp et al. | 375/116 |
| 5,331,668 | 7/1994 | Tanaka | 375/116 |
| 5,490,147 | 2/1996 | Kubo | 375/105.1 |

*Primary Examiner*—Stephen Chin
*Assistant Examiner*—Joseph Roundtree
*Attorney, Agent, or Firm*—Oppenheimer Poms Smith

[57] ABSTRACT

A T1 digital PCM signal frame synchronizer includes a RAM memory for storing a complete extended superframe of received data, a pattern detector for detecting patterns in the memory that match a predetermined frame alignment signal, and a plurality of address pointer registers and associated counters. A given address within the RAM corresponds to a particular bit position within the received data. The first time that a pattern is detected at a given address within memory, that address is stored into a register, and its associated counter set to one. Subsequent pattern matches and violations at that address cause the counter to increment and decrement, respectively. A register whose counter value decrements down to zero becomes available for storing a new address. In-sync is declared when any counter exceeds an in-sync threshold. Out-of-sync is declared when that counter falls to an out-of-sync threshold or below. The synchronizer continues to search for alternative candidates even after synchronization is declared. When the number of registers provided is limited, initial synchronization speed is increased by storing the address for only every other pattern match for the first three extended superframes of received data, thus ensuring that the pattern matches initially recorded will be more evenly distributed throughout the extended superframe of received data.

26 Claims, 2 Drawing Sheets

METHOD AND APPARATUS FOR FAST SYNCHRONIZATION OF T1 EXTENDED SUPERFRAMES

BACKGROUND OF THE INVENTION

1. Field of the Invention

The present invention generally relates to frame synchronization of digital data transmissions, and more particularly to an apparatus and method for fast synchronization of T1 extended superframes.

2. Description of the Related Art

Modern telecommunication systems transmit large amounts of data rapidly between data communications devices. In digital data transmissions systems, the receiving equipment must be able to discern where in the bit stream being received one distinct package (frame) of information ends and where the next frame begins. This is the problem of frame recovery, or frame synchronization.

Frame synchronization involves both the task of frame search and out-of-frame detection. Frame search involves detecting where a frame begins, either because the transmission has newly begun or because frame synchronization was lost during the course of a transmission. Out-of-frame detection involves detecting when synchronization between sender and receiver has been lost, so that the receiver knows that frame search must be reinitiated.

A commonly used standard for sending telephone signals in the United States is the International Telegraph and Telephone Consultative Committee (CCITT) Recommendation G.704, more commonly referred to as the T1 standard. A T1 systems uses a 1.544 megabit/second pulse code modulation (PCM) digital signal. The T1 signal includes 24 time domain multiplexed channels, for carrying 24 separate channels such as voice conversations simultaneously on the single T1 carrier.

In the T1 standard, eight bits comprise a single sample composed of one 7-bit A/D sample of one voice channel plus one signalling bit. A "frame" is defined as 24 samples, plus one framing bit termed the F bit which occupies the first bit position, for 193 total bits per frame. A superframe is defined as 12 frames. In Extended SuperFormat, an extended superframe (ESF) is defined 24 frames (4632 bits). Each channel is sampled at an 8 KHz rate, so the T1 signal comprises 8000 193-bit frames per second, or 1.544 megabit/second.

In a data transmission system such as a T1 system, the receiver must be able to identify the beginning of an ESF. The F bit in frame numbers 4, 8, 12, 16, 20, and 24 are used for this function. That is, they allow the receiver to determine the starting position of an ESF. These bits are encoded with the deterministic frame synchronization pattern 001011. This pattern is also called the frame alignment signal (FAS).

A framing synchronization circuit within a data receiver searches the incoming bit stream for the deterministic synchronization pattern. When the circuit identifies the framing pattern in several consecutive ESF's, the circuit declares an in-sync condition. If, after the system is in sync, a sufficient number of ESF's occur that do not contain the deterministic pattern in the expected bit positions, an out-of-sync condition is declared and the circuit begins another frame search.

There are two measures usually applied to gauge the effectiveness of a framing synchronization circuit. The effectiveness of the out-of-frame strategy can be gauged by the rate of "misframes", which are unnecessary reframes (because the circuit is actually in frame) caused by transmission errors. The effectiveness of a reframe search can be measured by the "average reframe time", which is the average time to resynchronize. The reframe time can only be expressed as an average because the search time depends on all the bits which are examined during the reframe, most of which are not framing bits and are therefore random.

The simplest method of T1 extended superframe synchronization is to start with an arbitrary bit position by shifting one arbitrarily chosen bit of the incoming data stream into a 6×1 shift register, and then shift in every 772nd bit (four frames) thereafter until 6 bits have been shifted in. If a pattern violation (any pattern other than the synchronization pattern) is observed, then discard that bit position and repeat the process for the next bit position.

When a bit position has been chosen in which the synchronization pattern is observed for the requisite number of ESF's in a row then declare the system to be in sync. The number of framing patterns necessary to declare an in-sync condition is often chosen to have a value of around three, since it is extremely unlikely that a bit position will include three synchronization patterns in a row, unless the chosen bit position is indeed the F position.

If the observed pattern is a circularly shifted version of the framing pattern as for example 110010, then the system is in-sync although the observation of the bit stream began in the middle of an ESF rather than at the beginning. In that case, the receiver will know where the beginning of an ESF is, and will interpret the incoming bit stream accordingly. A serious drawback of this frame search method is the excessive amount of time required to synchronize to a incoming signal.

A faster method of frame searching involves the use of a sliding window. In this method, the data is examined through a sliding window of k consecutive bit positions, each of which is being examined for the expected framing pattern. Each time one or more framing pattern violations are observed, the k-bit window is slid along the frame as far as possible. When the actual synchronization bit appears in the window, in-sync is declared by eventually observing violations in all the other bit positions, and by recognizing the known synchronization pattern in the actual framing bit position for the required number of ESF's in a row.

In this method, the fastest reframe corresponds to a window the same size as the ESF. This is the smallest number of bits always guaranteed to include the known framing pattern. However, using a window the same size as an ESF requires a large amount of hardware, since not only must an entire superframe be stored, but the circuit must be able to track the pattern matches and violations that have occurred for each position within the superframe. Furthermore, conventionally used shift registers capable of holding an entire ESF require an excessively large number of gates to implement.

Regardless of the size of the window used, once frame has been detected and the system declared in sync, the receiver will continue to observe bits in the F position. As long as the framing pattern is consistently observed, then the system has remained in sync. If, however, a framing pattern violation is observed, the system may have lost sync, or there may have simply been a transmission error. If a framing pattern violation is observed a sufficient number of times in a row, then the receiver declares an out-of-sync condition, and begins searching the incoming bit stream once more until it successfully synchronizes the incoming stream.

Several T1 framing synchronization circuits are commercially available. For these circuits, the observed maximum average reframe time is on the order of 40 to 50 ms. This represents approximately 70 Kbits of data being received before the receiving circuit synchronizes to and recognizes the data. This is an undesirably long period of time for many applications.

A need exists therefore for a framing synchronization circuit that can quickly synchronize to an incoming T1 bit stream.

SUMMARY OF THE INVENTION

Accordingly, it is a general object of the present invention to provide a method and apparatus for performing fast frame synchronization for an incoming data stream.

It is also an object of the invention to provide a circuit for synchronizing a T1 signal.

It is a further object of the invention to provide a circuit and method for performing fast frame synchronization that requires only an acceptable number of gates to implement in hardware.

It is a still further object the invention to provide a frame synchronizing circuit wherein the data memory is a random access memory (RAM).

It is yet a further object of the present invention to provide a frame synchronizing circuit that is constantly searching for alternative candidates for the beginning of a frame, even after synchronization has occurred, so as to reduce the time needed to resynchronize after synchronization has been lost.

The frame synchronizer of the present invention includes a conventional RAM for storing an entire ESF's worth of an incoming bit stream. This conventional RAM memory is less costly and more available for board-level implementations, and uses less chip real estate for semicustom and full custom implementations, than the shift registers traditionally used in frame synchronizers.

The memory is continuously being examined for patterns matching the deterministic synchronization pattern. When a pattern match (a "hit") is first observed, the address within the memory that corresponds to the beginning bit of the pattern is stored in a register bank.

The register bank contents represent bit positions within the incoming data stream that are candidates for being the beginning of an ESF. Each register within the bank is divided into an address field and a count field. The address field contains the RAM address (corresponding to the bit position within the incoming data stream) at which the hit occurred, and the count field keeps track of how many hits have occurred at that address.

When a hit is observed, the count field is incremented. When a violation is observed, the count field is decremented. When the count field for any register increments above a predetermined threshold, the receiver is declared to be in-sync. When the count field decrements below a predetermined minimum value, the receiver is declared to be out-of-sync. Thus, if enough hits have occurred and those hits have occurred sufficiently recently, the receiver is in sync.

When the count for a register falls to 0, the register is made available for a new address to be stored within it upon the first occurrence of a new hit. That is, an address with a first and new hit will bump an address that has not had a recent hit from the candidate list. In this way, the register bank constantly keeps track of a number of candidate bit positions, and the relative likelihood of each of those candidates being the start of an ESF. Bit positions at which too many violations have been observed are discarded in favor of more likely candidates.

The synchronizer is always running in the background, keeping track of how many hits have been observed at what locations. Thus, if the receiver becomes misaligned with the incoming data, between the time that the misalignment occurs and the time that the receiver recognizes and declares an out-of-sync condition, the synchronizer is hunting for alternative candidates. By the time that an out-of-sync condition is finally declared, the receiver has several likely candidates already identified. This allows for extremely fast resynchronization.

The present invention also includes a probabilistic algorithm used to fill up the register bank at initial synchronization. This allows the number of registers within the register bank to be reduced, without unacceptably increasing the amount of time necessary for initial synchronization. Because registers are gate-intensive to implement in silicon, it is desirable to minimize the number of registers.

When the number of registers is less than the number of expected pattern matches within an initailly received ESF, the initial synchronization speed is increased by ignoring a certain percentage of initial pattern matches such that the record pattern matches are approximately evenly distributed throughout the initially received ESF period. This prevents "bunching" of the pattern matches in the first part of the ESF period, which would prevent bit positions near the end of the ESF from being examined for an excessive number of ESF periods. Thus, all bit positions are examined within only a few ESF periods, increasing the initial synchronization speed. More generally, the method of increasing initial synchronization speed comprises: at initial synchronization, ignoring a percentage of pattern matches within an initially received data block until a number of bits has been received, such that the pattern matches recorded for said initial data block are more evenly distributed throughout said initial data block.

In one aspect, the frame synchronizer of the present invention comprises a memory for storing incoming bits of a data bit stream, a pattern detector for detecting when the synchronization pattern appears within the memory, a plurality of pointers with each pointer for indicating a position within the memory in which the synchronization pattern was detected, a plurality of counters associated with the pointers such that each counter may correspond to a memory position, and means for adjusting the value of said counters in a first direction when the synchronization pattern is detected at memory positions corresponding to said counters. In another aspect, the invention comprises a frame synchronizer for synchronizing a data receiver to a received data stream, the frame synchronizer including means for detecting a repeated synchronization pattern at a first bit position within the received data stream and declaring said first bit position to be a frame synchronization bit position at which the receiver is synchronized, the frame synchronizer further including means for detecting a synchronization pattern violation at the first bit position and declaring an out-of-sync condition after the in-sync condition has been declared; wherein the frame synchronizer detects and records matches and violations of said synchronization pattern at a plurality of alternative candidate frame synchronization bit positions within the received data stream, during the time interval between an in-sync condition being declared and an out-of-sync condition being declared.

In yet another aspect, the invention comprises a framing circuit for a digital receiver in which received signals comprise a train of data bits including framing bits having a predetermined synchronization pattern at known intervals, the framing circuit comprising a RAM for storing the bits received within one of the known intervals, and a pattern detector for detecting patterns within the RAM that match the predetermined synchronization pattern. The RAM contains at least as many bits as are received by the receiver during one of the known intervals.

In yet a further aspect, a method of synchronizing a data receiver to a received bit stream comprises the steps of: storing received data bits within a memory; detecting when a pattern at a first position within the memory matches a predetermined synchronization pattern and incrementing a value contained within a first register in response thereto; and detecting a pattern violation at the first memory position and decrementing the value contained within the first register in response thereto. The method further comprises the following steps in the order named: declaring an in-sync condition when the value contained within the first register is greater than or equal to an in-sync threshold; detecting when a pattern at a second position within the memory matches the predetermined synchronization pattern and incrementing a value contained within a second register in response thereto; and declaring an out-of-sync condition when the value within the first register is less than or equal to an out-of-sync threshold. In one embodiment the memory is a RAM, with the number of received bits within the RAM being at least as great as the number of transmitted bits which contains an entire synchronization pattern. The method further includes the steps of: detecting when a pattern within the memory matches a circularly shifted version of the synchronization pattern, outputting a shift code in accordance with the number of bits by which the memory pattern is shifted from the synchronization pattern, and using the shift code as the most significant bits of an address to be stored within a register. In a further enhancement, the method includes the step of: during an initial synchronization period, identifying a pattern match between the data contained within a third memory position and the synchronization pattern, and storing the address of the third memory position into a third register a predetermined percentage of the time.

The present invention allows for extremely fast initial synchronization as well as extremely fast resynchronization after the system has fallen out of sync. The worst case time to synchronize in most commercially available T1 framers is in the order of 40 to 50 ms. In a preferred embodiment of the present invention using a register bank of 32 16-bit registers, both the time to initially synchronize and the time to resynchronize were on the order of 15 ms.

The above-described objects of the present invention and other features and benefits of the present invention will become clear to those skilled in the art when read in conjunction with the following detailed description of a preferred illustrative embodiment and viewed in conjunction with the attached drawings and appended claims.

DETAILED DESCRIPTION OF THE INVENTION

Figure 1:
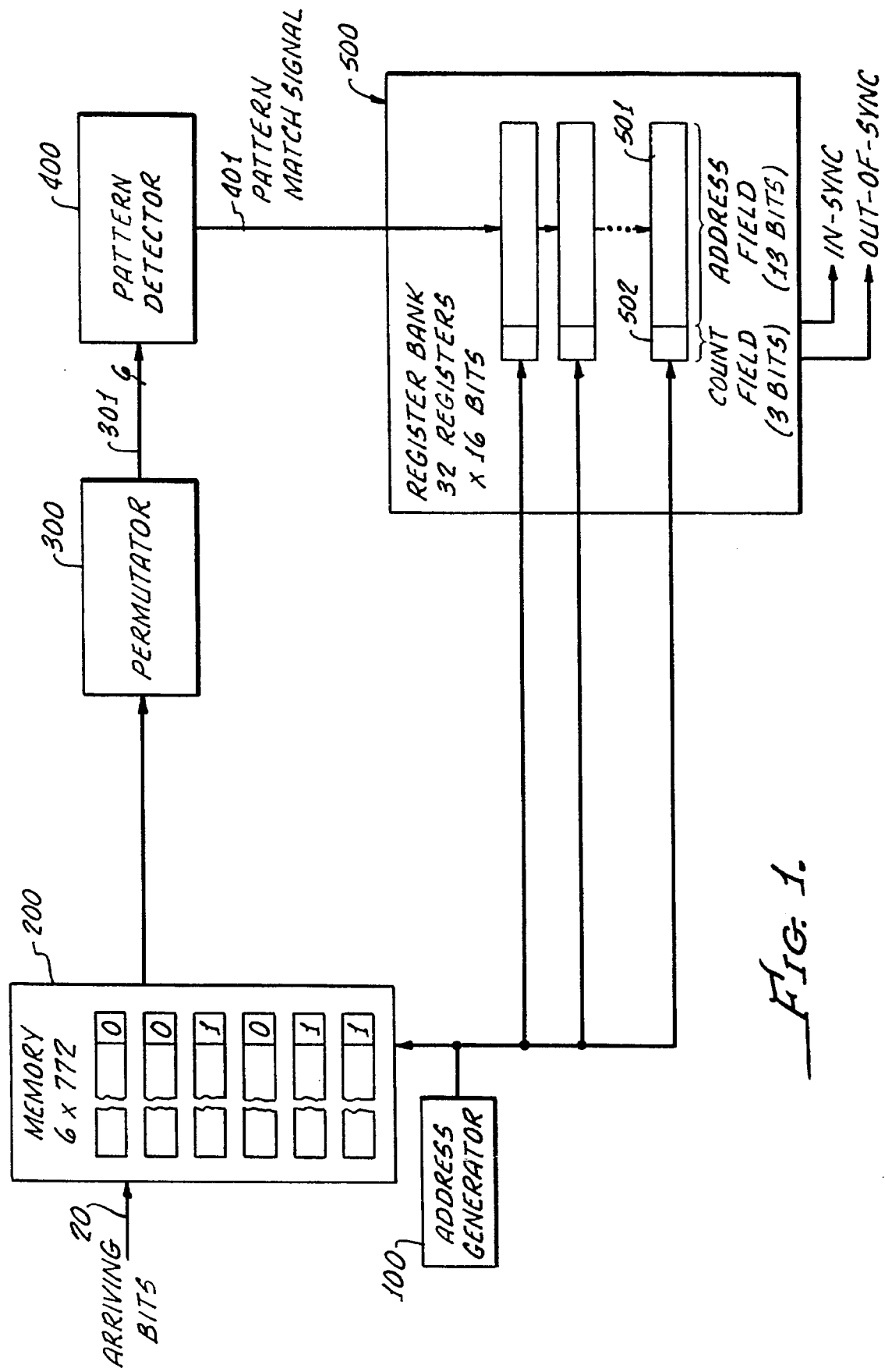
FIG. 1 is high level block diagram of the T1 extended superframe synchronizer according to a first embodiment of the present invention.

Referring to FIG. 1, arriving bits of the incoming serial data stream 20 are placed into successive locations in RAM memory 200 as they are received. Memory 200 is labelled in FIG. 1 as being 6 addresses wide by 772 bits deep only to illustrate the way in which the memory is used within the invention. This illustrates the logical rather than the physical organization of the data.

The memory can be physically organized in any of various ways. For example, memory 200 could be a 1024×8 memory, with the first 97 addresses within the first block of $2^7$ physical addresses corresponding to the first 772 received bits, the first 97 addresses within the second block of $2^7$ physical addresses corresponding to the second 772 bits, etc. Unused portions of memory 200 may be used for other tasks.

In a software implementation, memory 200 may be a dedicated portion of system RAM. Memory 200 is labelled as 772×6 only to illustrate that the T1 synchronizer of the present invention is searching for a repeating deterministic synchronization pattern of 6 bits, with one bit of the pattern being received every 772 bits.

Although memory 200 is described as a RAM, it is also possible to use other types of memory such as serial access memory (SAM), video RAM (VRAM), or dual port RAM. While each type of memory has its own advantages and disadvantages, a RAM is generally preferred. Furthermore, these other types of memory are not usually available for cell-based semicustom or full custom implementations.

Whatever the organization and nature of memory 200, address generator 100 controls the loading of incoming bits 20 into logically successive locations within memory 200. When the first 772×5 bits (3860 bits) have been received and loaded into memory 200, as each successive bit is received the 6 bits that comprise every 772nd received bit are read out of memory 200 and sent to permutator 300. Address generator 100 supplies the addresses for these read operations as well. Permutator 300 performs a serial-to-parallel conversion, and also performs 5 circular shifts on the 6 bits, and presents the resulting six different 6-bit words 301 to pattern detector 400.

Pattern detector 400 compares each of these words 301 to the deterministic synchronization pattern (001011). If there is a match, then pattern match signal 401 is generated indicating that the present address is a candidate position for synchronizing on. Pattern match signal 401 causes the present address to be loaded into the first available register in the 13-bit address field 501 (pointer), and the corresponding 3-bit count field 502 to be set to 1. An available register is defined as a register whose count field has fallen to a replacement threshold. In the illustrative embodiment, the replacement threshold is 0. At initialization, all of the counts are set to 0, so all registers are available.

The process is repeated for every received bit thereafter. That is, each time a new bit is received, it is presented to permutator 300 along with the 5 prior bits received in every 772nd bit location, and these 6 bits are examined by pattern detector 400 to determine if they contain the synchronization pattern. If yes, then the address of the newly received bit (representing the beginning of a pattern matching the synchronization pattern) is stored into an available register, and the corresponding count is incremented by one.

The next time this same address is examined (4632 received bits later), a second match will cause the count field to be incremented again. A pattern mismatch or pattern violation will cause the count field to be decremented by one. If the count equals or exceeds an in-sync threshold, then frame synchronization is declared at that position. The count is not allowed to increment above a predetermined maximum value. In the illustrative embodiment, the in-sync threshold is 4, and the maximum value is 7.

Pattern violations cause the count to be decremented. In this regard, the register bank can be thought of as decaying table of addresses. After synchronization has occurred, if the count at the synchronization position falls to 2, then the system is declared to be out of synchronization. That is, an out-of-sync condition is declared when the count at a previously synchronized position falls to an out-of-sync threshold or below. Once this happens, if the count in one of the other registers is or becomes 4 or greater, then the framer is resynchronized at that position.

The frame synchronizer is always running in the background looking for other matches. Even after synchronization has occurred, other potential candidates for synchronization are constantly being examined, stored, incremented, decremented, and discarded as appropriate. Thus, while the frame synchronizer is in an in-sync condition, other counters are being incremented and decremented upon the detection and non-detection, respectively, of a synchronization pattern. If, after synchronization has occurred, some number of bit positions is lost due to transmission or reception errors the receiver will not declare an out-of-sync condition until approximately 5 ESF periods have passed.

This is the number of ESF's necessary to cause the counter associated with the synchronization address to decrement from 7 to 2. During the time that these 5 ESF's are being received, the synchronizer will have already identified several alternative candidates available to choose from, and, assuming no other errors have occurred, will have already detected the synchronization pattern at its new position. That is, by the time the 5th ESF has passed, the new position will have already had its associated address incremented to 4, the synchronization threshold.

Thus, the system will already be resynchronized to the correct position by the time an out-of-sync condition is declared. This feature allows extremely fast resynchronization, and defines a significant advantage over prior art synchronizers.

Another significant advantage of the present invention is that it employs a conventional RAM memory as opposed to shift registers to store an entire ESF's worth of data. This allows the circuit to be implemented using fewer gates, which translates to less chip real estate on a custom or semicustom chip implementation, or alternatively a more economical and more readily available memory to be used in a circuit board level implementation.

Yet another advantage of the present invention is that it allows an entire ESF to be stored in memory, thus allowing the entire ESF to be examined at once for synchronization position candidates.

Theoretical calculations suggest that the number of pattern matches expected in any single ESF (4632 bits) is about 78, which is slightly more than the 72.4 matches that could be expected if the data were completely random. This suggests that for greatest synchronization speed, the number of registers within register bank 500 should be 78 or more, so that every candidate that is observed within the first incoming superframe can be recorded.

However, implementing 78 registers, along with associated logic for comparing the address field with the present address and incrementing, decrementing, and testing the count field, would require an excessive number of gates. If the number of registers is decreased to 32, simulations have indicated that the resulting synchronization time is quite large, on the order of 50 ms or more. This is because with 78 pattern matches every ESF, 32 pattern matches can be expected on the average within the first 1900 bits or so.

Thus, the first half of the ESF (2316 bits) to be examined will fill up the entire register bank, leaving no registers for recording any pattern matches (candidates) that may have occurred during the rest of the incoming ESF. In the next ESF interval, most of these registers will become available by having their counts decremented to 0. However, because this 2nd ESF will be examined in the same order as the prior ESF, when a given register becomes available it will most likely be quickly loaded with an address very near to the address that was just cleared from it. Although eventually the examined bit positions will "migrate" throughout the ESF, it will take several ESF time periods before the second half of the ESF is examined, and candidates within it identified.

Once the framer has been running for some period of time, the addresses stored in the 32 registers will be more or less randomly distributed throughout the ESF. Hence it takes much less time on the average to resynchronize than it does to initially synchronize.

To reduce the time necessary to synchronize initially, the following modification can be made. When the framer is first started, for the first approximately 3 ESF periods, record approximately 50% of observed pattern matches, and ignore the other approximately 50% This could be implemented by simply ignoring every other pattern match. The storage probability corresponds approximately to the ratio of registers within the register bank to the number of total expected pattern matches per ESF, including both true matches and false matches (a match at an address that is not the beginning of a true synchronization pattern).

This has the effect of populating the registers with addresses that are well spread out among the 4632 possible locations, rather than being concentrated in the first 2316 bits. Simulations incorporating this modification indicated that the time to synchronize for the first time was reduced from about 50 ms to less than 15 ms in most cases.

Figure 2:
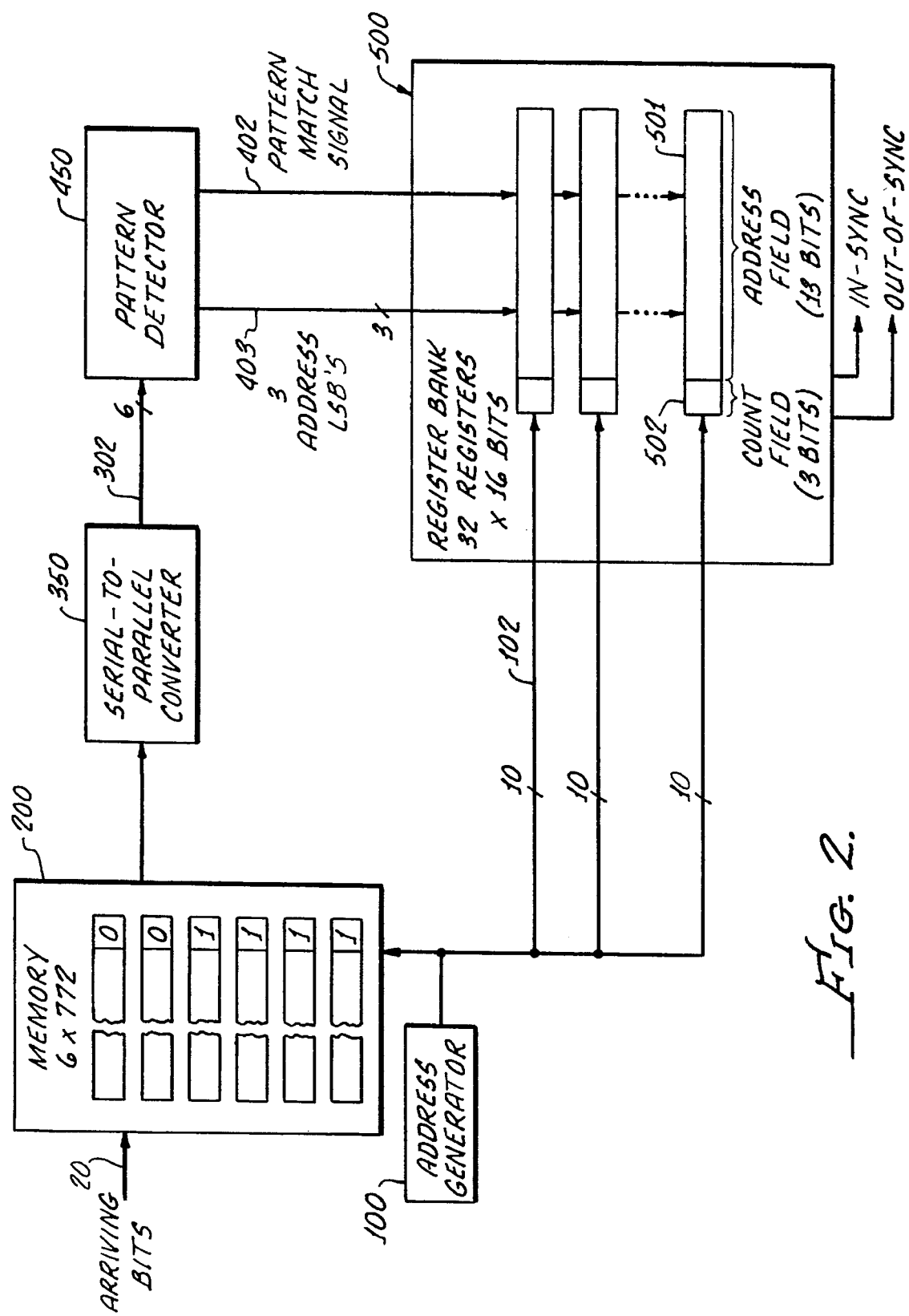
FIG. 2 is a high level block diagram of the T1 superframe synchronizer according to a second embodiment of the invention.

FIG. 2 illustrates a second preferred embodiment that is useful for those applications where, due to timing or other constraints, it is desirable to reduce the number of read operations that must be performed on memory 200. For such situations, it is possible to reduce the number of memory read accesses by five-sixths. Rather than reading 6 locations out of memory 200 every time a new bit is received, 6 locations are read out only for the first 772 bits within a 6×772 bit data stream.

These 6 bits are converted to a parallel 6-bit word 302 by serial-to-parallel converter 350. Pattern detector 450 not only examines the 6-bit word 302 it receives for the synchronization pattern (001011), but also examines word 302 for circularly shifted versions of the synchronization pattern, such as 110010. If any match occurs, pattern detector 450 generates both a pattern match signal 402 and a 3-bit shift position code 403 indicating which of 6 possible shifted versions of the pattern was detected.

This 3-bit shift code 403 defines the 3 most significant bits (MSB's) which, along with the 10 least significant bits (LSB's) 102, form a 13-bit address (pointer) that uniquely identifies which of the 6×772 bits in memory represents the beginning of an observed synchronization pattern. Because the contents of memory are being examined for the synchronization pattern starting only with the first 772 bits and not for the other 5×772 bits, the total number of read accesses required for memory reads is reduced by five-sixths, for a total of 4632 read accesses per ESF.

The number of memory accesses could be reduced still further by increasing the width of the serial-to-parallel converter 350. In the foregoing discussion, 6 addresses must be read out of memory 200, with serial-to-parallel converter 350 receiving 1 bit from each of those 6 addresses and converting those 6 bits to a single 6-bit word. However, depending on its implementation memory 200 will output more than a single bit at a time.

For example, if memory 200 is organized to contain 8-bit words, then memory 200 will output an 8-bit word for each read operation performed on it. If parallel-to-serial converter 350 were modified to receive, for example, six 8-bit words, and present those bits as eight 6-bit words to pattern detector 450, then the total number of memory read operations performed on memory 200 would be reduced to one-eighth the previous value. That is, only 772 read operations would be necessary to examine all 4632 bit positions within an ESF for the beginning of a synchronization pattern.

The foregoing discussion has focussed on a hardware implementation of the present invention. More particularly, the foregoing discussion has focussed on a hardware architecture primarily intended to be implemented as an ASIC core macro. As will be appreciated by one skilled in the art, the T1 superframe synchronizer of the present invention could be implemented in software rather than hardware.

A software implementation would simply require utilizing software commands to implement the various synchronizer functions or their equivalents, that have been described in hardware terms in the foregoing description and embodiments. For example, the pattern detector could be implemented by a COMPARE command. Similarly, the counter field and address field of a register could be implemented by separate or associated memory locations, using RAM or CPU registers, or any similar combination.

Many ways of implementing the present invention in software will be apparent to one skilled in the art of software from viewing the specification and attached claims. Various modifications to the basic structure disclosed herein for the purpose of increasing execution speed would also be apparent to one skilled in software. Such software implementations and modifications are fully contemplated as being within the scope of the present invention.

As will be further appreciated, the foregoing invention is not limited to T1 superframe synchronization, but is applicable to the more general problem of synchronizing an incoming data stream, wherein a particular pattern repeated every n bits within a data stream denotes the beginning of a particular subdivision of the transmitted data. The particular subdivision may comprise a frame, a superframe, an extended superframe, or any other subdivision of data.

As will be further appreciated, the terms incrementing and decrementing as used in the foregoing discussion are merely relative terms. The counters could instead be decremented upon pattern matches and incremented on pattern violations, with appropriate changes to the threshold values. As will also be appreciated, the increment value need not equal the decrement value. Rather, the increment value may be adjusted relative to the decrement value to optimize the receiver according to the expected rate and nature (e.g., random vs. burst) of transmission/reception errors, the percentage of false pattern matches expected within a subdivision of data, and various other environmental and statistical characteristics and performance requirements.

As will be further appreciated, it is possible to use otherwise unused locations within memory 200 to implement registers within register bank 500. Although this would require appropriate modifications to the logic circuitry, the point is that the registers, while being conceptually distinct from the memory for purposes of the illustrative embodiments presented herein, need not be physically distinct.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A frame synchronizer for synchronizing a data receiver to an incoming T1 data bit stream, the T1 data bit stream including a repeated deterministic frame alignment signal within a 4632-bit extended superframe, the frame synchronizer comprising:

a random access memory (RAM) for storing an extended superframe's worth of consecutively received bits;

an address generator for controlling read and write addresses for said RAM;

a serial to parallel converter for converting serial bits read from said RAM beginning with a starting address, to a 6-bit parallel word;

a pattern detector for determining whether said 6-bit parallel word including any circularly shifted version thereof matches said frame alignment signal, and generating a pattern match signal in response thereto;

a plurality of registers, each register comprising:
an address field for storing a RAM address; and
an associated count field incremented upon observed pattern matches at said RAM address, and decremented upon observed pattern violations at said RAM address;

means for declaring in-sync and out-of-sync conditions in response to values contained within said count fields; and wherein said count fields are incremented and decremented in response to observed pattern matches and pattern violations, respectively, during both in-sync and out-of-sync conditions.

2. A frame synchronizer according to claim 1, wherein:

said registers are fewer in number than the number of expected pattern matches within an initially received extended superframe's worth of data; and a percentage of pattern matches observed within said initially received extended superframe's worth of data are ignored, such that the pattern matches recorded for said initially received extended superframe's worth of data are approximately evenly distributed throughout said initially received extended superframe's worth of data.

3. In a framing synchronizer, the synchronizer receiving an initial data block during an initial synchronization period, the synchronizer having a pattern detector for detecting occurrences of a synchronization pattern within said initial data block, the frame synchronizer further having a register bank comprising a plurality of registers for recording pattern matches and pattern violations observed at various positions within said initial data block, the number of registers being less than the expected number of pattern matches observed within said initial data block, a method of increasing initial synchronization speed comprising:

at initial synchronization, ignoring a percentage of pattern matches within said initial data block until a number of bits has been received, such that the pattern matches recorded for said initial data block are more evenly distributed throughout said initial data block.

4. The method of claim 3, wherein:

said percentage is approximately equal to the ratio of the number of registers to the expected number of pattern matches observed within said initial data block.

5. The method of claim 4, wherein said percentage is approximately equal to 50%.

6. The method of claim 5, wherein said number of bits received is approximately equal to three times the number of bits within said initial data block.

7. A frame synchronizer for synchronizing a data receiver to an incoming data stream, the data stream including a deterministic synchronization pattern, the frame synchronizer comprising:

a memory for storing incoming bits of the data bit stream;

a pattern detector for detecting when the synchronization pattern appears within the memory;

a plurality of pointers, each pointer for indicating a position within the memory in which the synchronization pattern was detected;

a plurality of counters each containing a value, each counter associated with a respective pointer, whereby each counter may correspond to a position within said memory; and means for adjusting the value of said counters in a first direction when the synchronization pattern is detected at memory positions corresponding to said counters.

8. A frame synchronizer as defined in claim 7 further comprising:

means for adjusting said counters in a second direction when a pattern violation is observed at memory positions corresponding to said counters.

9. The frame synchronizer as defined in claim 8, wherein said means for adjusting said counters in a first direction comprises incrementing means, and said means for adjusting said counters in a second direction comprises decrementing means.

10. A frame synchronizer as defined in claim 9, further comprising:

an in-sync condition detector for detecting when a first counter from among said plurality of counters exceeds an in-sync threshold and declaring an in-sync condition in response thereto; and an out-of-sync condition detector for detecting when the first counter has fallen below an out-of-sync threshold and declaring an out-of-sync condition in response thereto.

11. A frame synchronizer as defined in claim 10, wherein said incrementing and decrementing means include:

means for incrementing and decrementing a second counter from among said plurality of counters upon the detection and non-detection, respectively, of a synchronization pattern, while the frame synchronizer is in an in-sync condition.

12. A frame synchronizer as defined in claim 11, each memory position having an address; the frame synchronizer further comprising:

pointer loading means for loading a given pointer with a value corresponding to a memory position at which the synchronization pattern was detected, when the counter associated with said given pointer is less than a replacement threshold.

13. A frame synchronizer as defined in claim 12, wherein said incoming data stream is a T1 data stream.

14. A frame synchronizer as defined in claim 13, wherein said plurality of pointers and said plurality of counters define a register bank, each register having 16 bits comprising a 13 bit address field and a 3-bit counter field.

15. A frame synchronizer as defined in claim 14, further comprising:

an in-sync condition detector for detecting when the count held by a first counter equals 4 and declaring an in-sync condition in response thereto; and an out-of-sync condition detector for detecting when the count held by said first counter has fallen to 2 and declaring an out-of-sync condition in response thereto.

16. A frame synchronizer as defined in claim 14, wherein said register bank comprises 32 registers.

17. A computer readable memory capable of causing a computer to implement the frame synchronizer of claim 7.

18. A frame synchronizer for synchronizing a data receiver to a received data stream, the frame synchronizer including means for detecting a repeated synchronization pattern at a first bit position within the received data stream and declaring said first bit position to be a frame synchronization bit position at which the receiver is synchronized, the frame synchronizer further including means for detecting a synchronization pattern violation at the first bit position and declaring an out-of-sync condition after the in-sync condition has been declared, wherein:

the frame synchronizer detects and records matches of said synchronization pattern at a plurality of alternative candidate frame synchronization bit positions within the received data stream, during the time interval between an in-sync condition being declared and an out-of-sync condition being declared.

19. A frame synchronizer according to claim 18, wherein:

the frame synchronizer detects and records violations of said synchronization pattern at said alternative candidate frame synchronization bit positions, during the time interval between an in-sync condition being declared and an out-of-sync condition being declared.

20. A framing circuit for a digital receiver in which received signals comprise a train of data bits including framing bits having a predetermined synchronization pattern at known intervals, the framing circuit comprising:

a random access memory (RAM) for storing the bits received within one of said known intervals; and a pattern detector for detecting patterns within said RAM that match said predetermined synchronization pattern.

21. The framing circuit of claim 20 wherein:

said RAM contains at least as many bits as are received by said receiver during said known interval.

22. A method of synchronizing a data receiver to a received bit stream, the method comprising the steps of:

storing received data bits within a memory;

detecting when a pattern at a first position within the memory matches a predetermined synchronization pattern and incrementing a value contained within a first register in response thereto;

detecting a pattern violation at the first memory position and decrementing the value contained within the first register in response thereto;

the method further comprising the following steps in the order named:

declaring an in-sync condition when the value contained within the first register is greater than or equal to an in-sync threshold;

detecting when a pattern at a second position within the memory matches the predetermined synchronization pattern and incrementing a value contained within a second register in response thereto and;

declaring an out-of-sync condition when the value within the first register is less than or equal to an out-of-sync threshold.

23. A method of synchronizing a data receiver as defined in claim 22, wherein:

the memory comprises a RAM; and the number of received bits stored within the RAM is at least as great as the number of transmitted bits which contains an entire synchronization pattern.

24. A method of synchronizing a data receiver as defined in claim 23, the method further comprising the steps of:

detecting when a pattern within said memory matches a circularly shifted version of the synchronization pattern, and outputting a shift code in accordance with the number of bits by which the memory pattern is shifted from the synchronization pattern; and using the shift code as the most significant bits of an address to be stored within a register.

25. A method of synchronizing a data receiver as defined in claim 23, the method further comprising the steps of:

during an initial synchronization period, identifying a pattern match between the data contained within a third memory position and the synchronization pattern, and storing the address of the third memory position into a third register a predetermined percentage of the time.

26. A method of synchronizing a data receiver as defined in claim 23, the step of incrementing the value contained within a second register including the step of:

incrementing the value contained within a second register to be greater than or equal to said in-sync threshold.

* * * * *